(12) United States Patent
Liang

(10) Patent No.: US 12,096,527 B2
(45) Date of Patent: Sep. 17, 2024

(54) MULTIFUNCTIONAL DIMMING POWER SUPPLY CIRCUIT FOR LED LIGHT SOURCE

(71) Applicant: Jianhua Liang, Guangning (CN)

(72) Inventor: Jianhua Liang, Guangning (CN)

( * ) Notice: Subject to any disclaimer, the term of this patent is extended or adjusted under 35 U.S.C. 154(b) by 15 days.

(21) Appl. No.: 18/295,873

(22) Filed: Apr. 5, 2023

(65) Prior Publication Data
US 2023/0247739 A1  Aug. 3, 2023

(30) Foreign Application Priority Data
Feb. 21, 2023  (CN) .......................... 202320270392.8

(51) Int. Cl.
*H05B 45/14*  (2020.01)
*H05B 45/345*  (2020.01)
*H05B 45/37*  (2020.01)

(52) U.S. Cl.
CPC ........... *H05B 45/14* (2020.01); *H05B 45/345* (2020.01); *H05B 45/37* (2020.01)

(58) Field of Classification Search
None
See application file for complete search history.

(56) References Cited

U.S. PATENT DOCUMENTS

| | | |
|---|---|---|
| 2012/0242237 A1 | 9/2012 | Chen et al. |
| 2013/0134894 A1 | 5/2013 | Kuang |
| 2014/0062325 A1 | 3/2014 | Chen et al. |
| 2016/0323972 A1* | 11/2016 | Bora ...................... H05B 47/11 |
| 2017/0245354 A1* | 8/2017 | Yadav .................... H05B 47/19 |
| 2021/0307142 A1* | 9/2021 | Bocock ............... H02M 1/4258 |

* cited by examiner

*Primary Examiner* — Anh Q Tran
(74) *Attorney, Agent, or Firm* — Zhigang Ma

(57) ABSTRACT

An embodiment of the present disclosure discloses a multifunctional dimming power supply circuit for an LED light source, including an alternating-current input circuit, an alternating-current/direct-current (AC/DC) circuit, a feedback control loop, an output circuit, a low dropout regulator (LDO) power circuit, a micro control unit (MCU) minimum system, a data storage circuit, a parameter setting circuit, and a Class2 acquisition circuit. By using the parameter setting circuit, a user can set different output powers, different color temperature values, and different dimming curves as required. Thus, the output circuit drives the LED light source according to parameters set by the user.

10 Claims, 10 Drawing Sheets

MULTIFUNCTIONAL DIMMING POWER SUPPLY CIRCUIT FOR LED LIGHT SOURCE

TECHNICAL FIELD

The present disclosure relates to the field of LED dimming, in particular to a multifunctional dimming power supply circuit for a light-emitting diode (LED) light source.

BACKGROUND

LED lighting has the advantages of high efficiency, energy conservation, ultra-long life, healthy light ray, environmental protection, and is widely used in industrial production and family life, such as an LED dimming power supply, an LED dimming controller, an LED lighting control system, and an LED lamps. However, the existing LED lighting usually has a single fixed output frequency, color temperature and dimming curve, which cannot meet diversified needs of users.

SUMMARY

An embodiment of the present disclosure provides a multifunctional dimming power supply circuit for an LED light source, which can switch various output frequencies, switch various color temperature values, switch various dimming curves and make the LED light source meet an American standard Class2.

In order to achieve the above objective, an embodiment of the present disclosure provides a multifunctional dimming power supply circuit for an LED light source, including an alternating-current input circuit, an alternating-current/direct-current (AC/DC) circuit, a feedback control loop, an output circuit, a low dropout regulator (LDO) power circuit, a micro control unit (MCU) minimum system, a data storage circuit, a parameter setting circuit and a Class2 acquisition circuit, wherein the alternating-current input circuit is connected to an AC/DC circuit to provide an alternating current;
the AC/DC circuit is connected to the output circuit, the feedback control loop and the LDO power circuit to convert the alternating current into a direct current;
the feedback control loop is used for controlling the AC/DC circuit according to the direct current output by the AC/DC circuit to make the AC/DC circuit output a stable direct current;
the LDO power circuit is used for converting the direct current output by the AC/DC circuit into low-voltage power supplied to the MCU minimum system, the data storage circuit, the parameter setting circuit and Class2 acquisition circuit;
the parameter setting circuit comprises at least one of a wireless communication module and a multi-gear switch; the wireless communication module and the multi-gear switch are used for obtaining set parameters according to an operation of a user; the set parameters comprise an output power parameter, a color temperature parameter and a dimming curve parameter; the multi-gear switch comprises a power gear switch for switching different output powers, a color temperature gear switch for switching different color temperatures and a dimming curve gear switch for switching different dimming curves; each gear of the power gear switch corresponds to one output power parameter; each gear of the color temperature gear switch corresponds to one color temperature parameter; each gear of the dimming curve gear switch corresponds to one dimming curve parameter;
the MCU minimum system is used for obtaining the set parameters and storing the set parameters to the data storage circuit, and the MCU minimum system is also used for generating a first control signal according to the set parameters;
the Class2 acquisition circuit is used for acquiring the set parameters through the MCU minimum system to generate a second control signal according to the set parameters; and
the output circuit is used for driving the LED light source to emit light by using the set parameters under the control of the first control signal and the second control signal, and make the output power and output current meet requirements of an American Standard Class2.

The alternating-current input circuit includes a live line input terminal, a null line input terminal, a variable resistor RV1, capacitors CX1, CX2, CY1, CY2, transformers L2, L3, resistors R16, R17, R20, R21, a null line output terminal AC_N and a live line output terminal AC_L.

The AC/DC circuit includes a rectifier DB1, capacitors C6, C7, C8, C9, C10, C11, C13, C14, C15, C20, C25, C24, C26, EC1, EC2, EC3, an inductor L1, a transformer L4, resistors R13, R18, R19, R22, R23, R24, R25, R26, R27, R28, R29, R30, R31, R33, R35, R37, diodes D1, D2, D3, D4, D6, D7, a voltage-regulator tube Z1, a metal oxide semiconductor (MOS) transistor Q3, a triode Q4 and a chip U3; and the transformer L4 includes a primary winding T1A, a first secondary winding T1B, a second secondary winding T1D and an auxiliary winding T1C.

The feedback control loop includes a diode D5, a capacitor C12, a resistor R32 and a resistor R34.

The output circuit includes interfaces JP1, JP2, capacitors C1, C2, C3, C4, C5, resistors R1, R2, R3, R4, R5, R6, R7, R8, R9, R10, R11, R12, R14, R15, diodes VD1, VD2, a MOS transistor Q2, chips U1, U2, and a programmable three-terminal voltage regulator IC1.

The LDO power circuit includes capacitors E1, C16, C17, C18, C19, and a chip U4.

The MCU minimum system includes a chip U5, capacitors C22, C28, C30, resistors R38, R39, R42, R44, and a crystal oscillator.

The data storage circuit includes a chip IC4, a capacitor C35, and resistors R50, R52.

The parameter setting circuit includes a chip IC3 and an interface JP3.

The Class2 acquisition circuit includes resistors R36, R40, R41, R43, R45, R47, R48, R49, R51, capacitors C23, C29, C31, C32, C33, C34, diodes D8, D9, and comparators IC2A, IC2B.

Beneficial effects: The multifunctional dimming power supply circuit for an LED light source includes an alternating-current input circuit, an alternating-current/direct-current (AC/DC) circuit, a feedback control loop, an output circuit, a low dropout regulator (LDO) power supply circuit, a micro control unit (MCU) minimum system, a data storage circuit, a parameter setting circuit, and a Class2 acquisition circuit. By using the parameter setting circuit, a user can set different output powers, different color temperature values, and different dimming curves as required. Thus, the output circuit drives the LED light source according to parameters set by the user. Therefore, the present disclosure can realize switching various color temperature values, switching various different output frequencies, switching various different dimming curves, and accurately calculate an output current and voltage by accurate control of the Class2 acquisition circuit and the MCU minimum system, so that a maximum output current does not exceed 5 A, and power does not exceed 100 W, so as to meet an American standard Class2.

BRIEF DESCRIPTION OF THE DRAWINGS

Specific implementations and beneficial effects of the present disclosure will be obvious through the detailed descriptions of the specific implementations of the present disclosure in combination with the accompanying drawings.

DETAILED DESCRIPTION OF THE EMBODIMENTS

Figure 1:
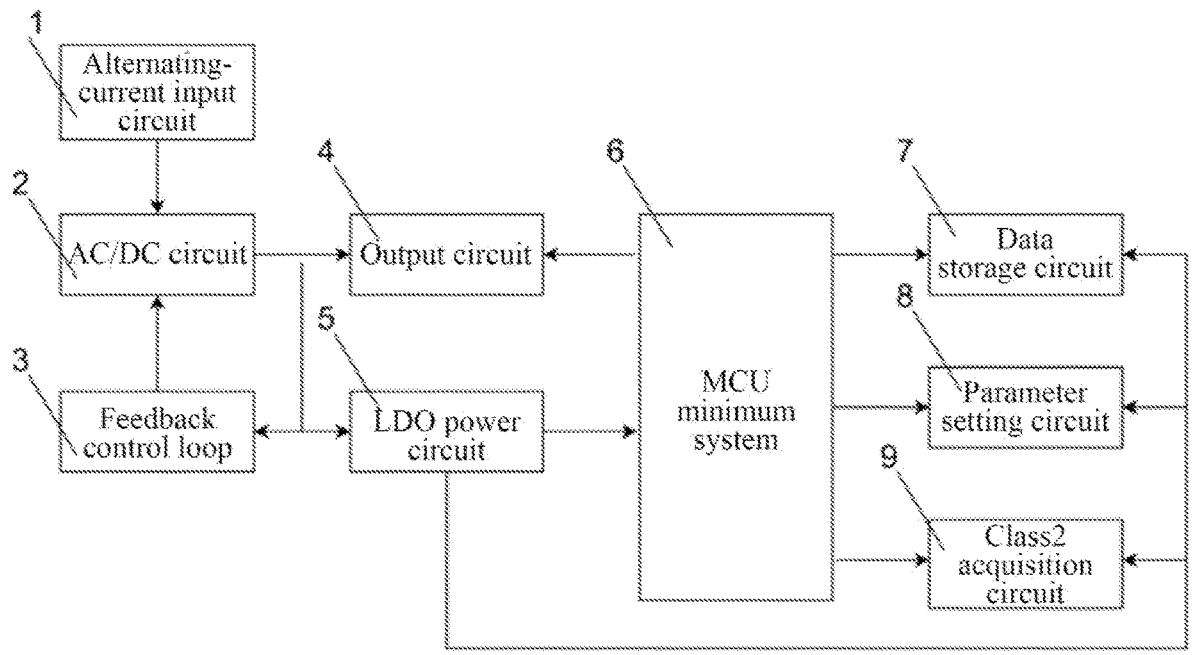
FIG. 1 is a structural block diagram of aa multifunctional dimming power supply circuit of the present disclosure.

Referring to the drawings, the same component symbol represents the same component. The principle of the present disclosure is illustrated by implementing the present disclosure in an appropriate computing environment. The following description is based on the specific illustrated embodiments of the present disclosure, which should not be regarded as limiting other specific embodiments of the present disclosure not detailed herein.

Referring to FIG. 1, an embodiment of the present disclosure provides a multifunctional dimming power supply circuit for an LED light source, including an alternating-current input circuit 1, an AC/DC circuit 2, a feedback control loop 3, an output circuit 4, an LDO power circuit 5, an MCU minimum system 6, a data storage circuit 7, a parameter setting circuit 8 and a Class2 acquisition circuit 9.

The alternating-current input circuit 1 is connected to the AC/DC circuit 2 to provide an alternating current, for example, to provide an alternating current of 50 HZ or 60 HZ.

The AC/DC circuit 2 is connected to the output circuit 4, the feedback control loop 3 and the LDO power circuit 5 to convert the alternating current into a direct current. The AC/DC circuit 2 can convert the alternating current of 50 HZ or 60 HZ into a direct current, and can use an integrated AC/DC chip or a discrete element to realize an AC/DC function.

The feedback control loop 3 is used for controlling the AC/DC circuit 2 according to the direct current output by the AC/DC circuit 2 to make the AC/DC circuit output a stable direct current.

The LDO power circuit 5 is used for converting the direct current output by the AC/DC circuit into low-voltage power supplied to the MCU minimum system 6, the data storage circuit 7, the parameter setting circuit 8 and Class2 acquisition circuit 9.

The parameter setting circuit 8 includes at least one of a wireless communication module and a multi-gear switch; the wireless communication module and the multi-gear switch are used for obtaining set parameters according to an operation of a user; the set parameters comprise an output power parameter, a color temperature parameter and a dimming curve parameter; the multi-gear switch includes a power gear switch for switching different output powers, a color temperature gear switch for switching different color temperatures and a dimming curve gear switch for switching different dimming curves; each gear of the power gear switch corresponds to one output power parameter; each gear of the color temperature gear switch corresponds to one color temperature parameter; and each gear of the dimming curve gear switch corresponds to one dimming curve parameter. A user can wirelessly communicate with the wireless communication module through a terminal device, such as a mobile phone, and send the output power parameter, the color temperature parameter and the dimming curve parameter to the wireless communication module, so as to obtain the set parameters sent by the user. In addition, the user can also correspondingly switch different output powers, color temperatures and dimming curves through the power gear switch, the color temperature gear switch and the dimming curve gear switch. Each gear switch corresponds to one corresponding parameter. For example, switching to one output power is realized at each time the power gear switch switches a gear.

The MCU minimum system 6 is used for obtaining the set parameters and storing the set parameters to the data storage circuit, and the MCU minimum system is also used for generating a first control signal according to the set parameters. The MCU minimum system 6 can be achieved by a microcontroller or a single-chip microcomputer. The microcontroller or the single-chip microcomputer has a data acquisition function or a computing ability.

The Class2 acquisition circuit 9 is used for acquiring the set parameters through the MCU minimum system 6 to generate a second control signal according to the set parameters. The second control signal is used for controlling output data of the output circuit 4 to meet requirements of an American standard Class2. Specifically, the second control signal is used for controlling a maximum output current of the output circuit 4 to not exceed 5 A and the output power to not exceed 100 W.

The output circuit 4 is used for driving the LED light source to emit light by using the set parameters under the control of the first control signal and the second control signal, and make the output power and output current meet the requirements of the American Standard Class2.

By using the parameter setting circuit, a user can set different output powers, different color temperature values, and different dimming curves as required, Thus, the output circuit drives the LED light source according to parameters set by the user. Therefore, the present disclosure can realize switching various color temperature values, switching various different output frequencies, switching various different dimming curves, and accurately calculate an output current and voltage by accurate control of the Class2 acquisition circuit and the MCU minimum system, so that a maximum output current does not exceed 5 A, and power does not exceed 100 W, so as to meet an American standard Class2.

The data storage circuit 7 can be achieved by using an external FLASH chip, an external EEPROM chip, a FLASH in an MCU, an EEPROM in the MCU, or an external SD card.

Figure 2:
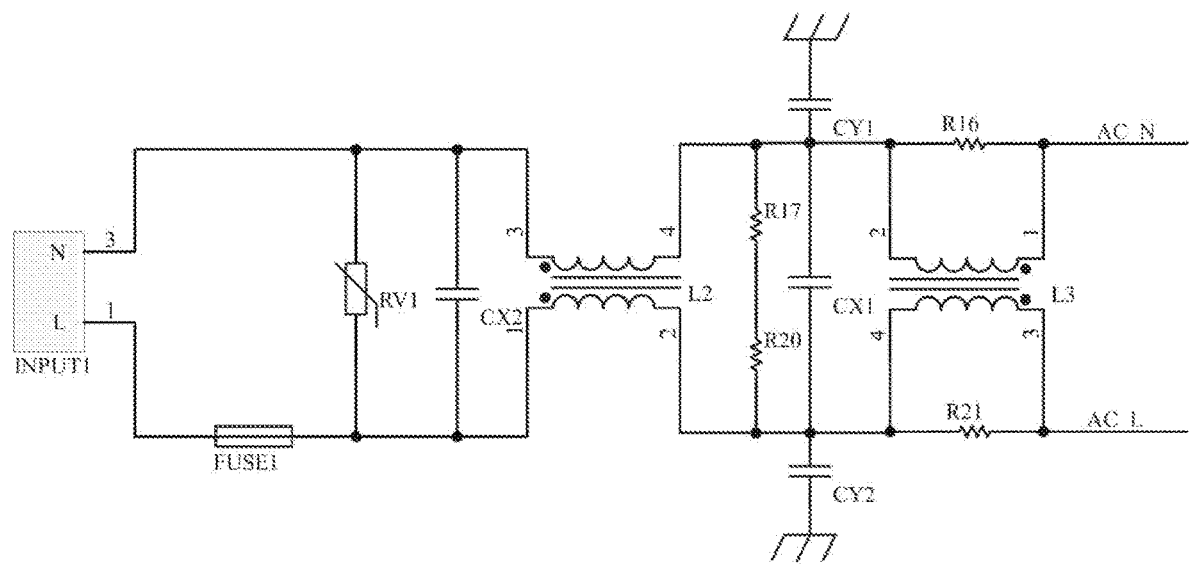
FIG. 2 is the schematic principle diagram of an alternating-current input circuit of the present disclosure.

Further, as shown in FIG. 2, the alternating-current input circuit 1 includes a live line input terminal, a null line input terminal, a variable resistor RV1, capacitors CX1, CX2, CY1, CY2, transformers L2, L3, resistors R16, R17, R20, R21, a null line output terminal AC_N and a live line output terminal AC_L.

Figure 3:
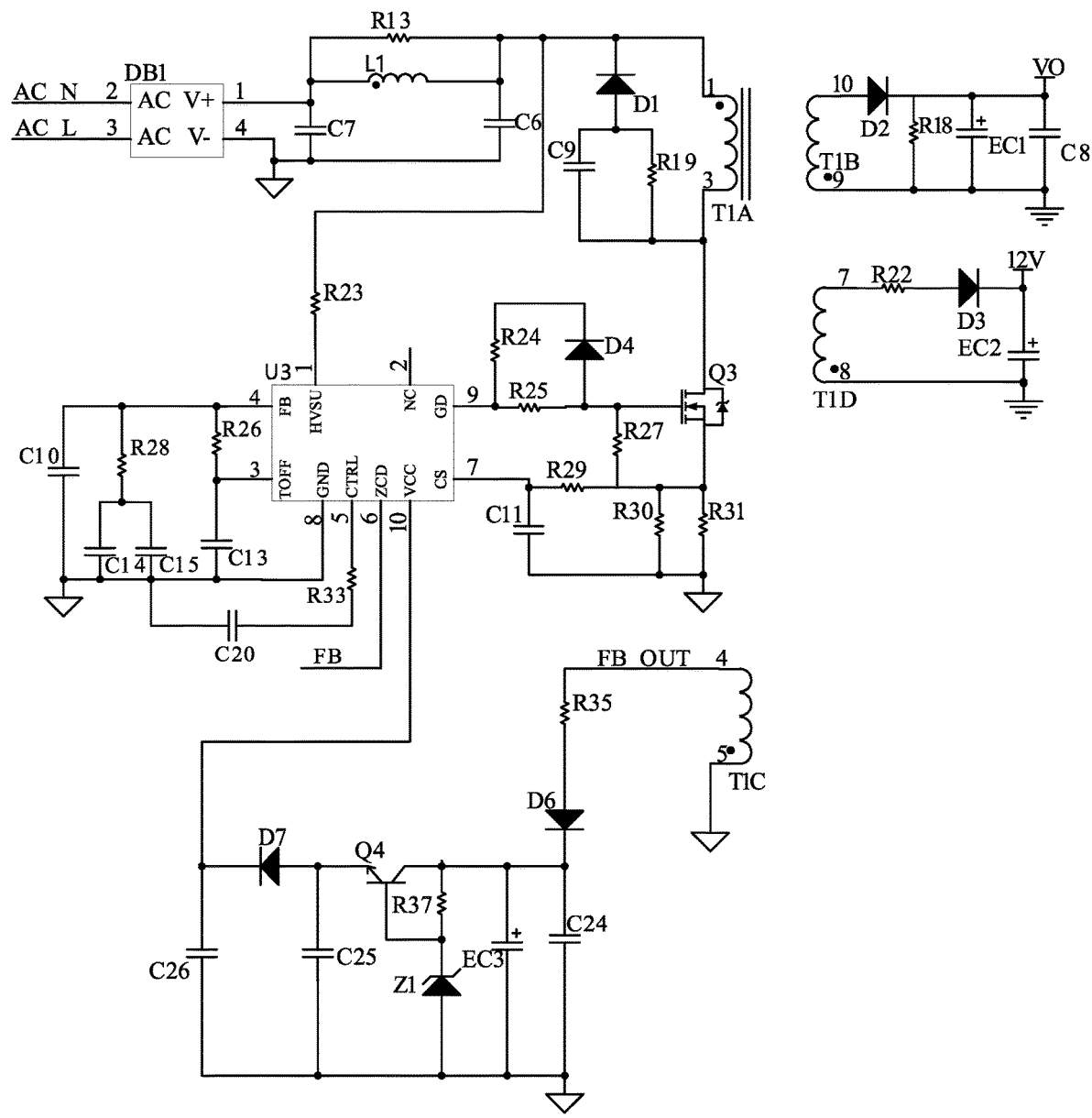
FIG. 3 is the schematic principle diagram of an AC/DC circuit of the present disclosure.

As shown in FIG. 3, the AC/DC circuit 2 includes a rectifier DB1, capacitors C6, C7, C8, C9, C10, C11, C13, C14, C15, C20, C25, C24, C26, EC1, EC2, EC3, an inductor L1, a transformer L4, resistors R13, R18, R19, R22, R23, R24, R25, R26, R27, R28, R29, R30, R31, R33, R35, R37, diodes D1, D2, D3, D4, D6, D7, a voltage-regulator tube Z1, a metal oxide semiconductor (MOS) transistor Q3, a triode Q4 and a chip U3; and the transformer L4 includes a primary winding T1A, a first secondary winding T1B, a second secondary winding T1D and an auxiliary winding T1C.

Figure 4:
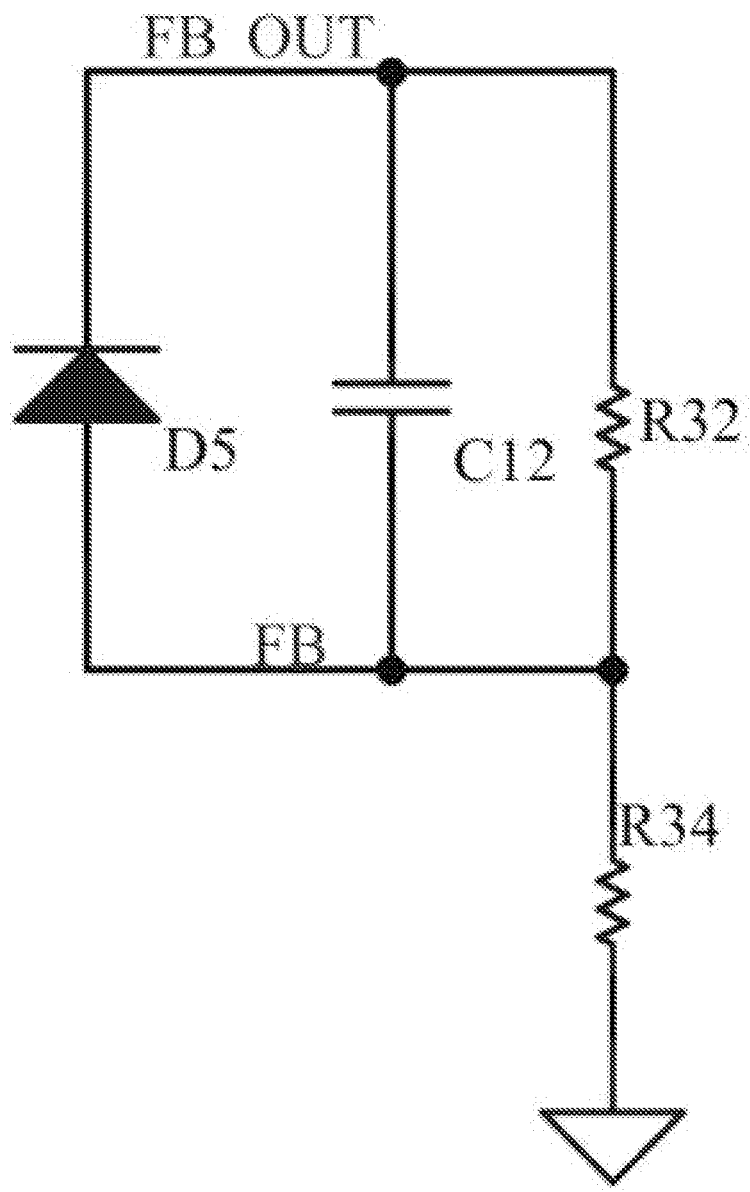
FIG. 4 is the schematic principle diagram of a feedback control loop of the present disclosure.

As shown in FIG. 4, the feedback control loop 3 includes a diode D5, a capacitor C12, a resistor R32 and a resistor R34.

A negative electrode of diode D5 is connected to a first end of the capacitor C12 and a first end of the he resistor R32 and connected to a first end of the auxiliary winding. A positive electrode of diode D5 is connected to a second end of the capacitor C12, a second end of the resistor R32 and a first end of the resistor R34 and connected to a pin ZCD of the chip U3. A second end of the resistor R34 is grounded.

Figure 5:
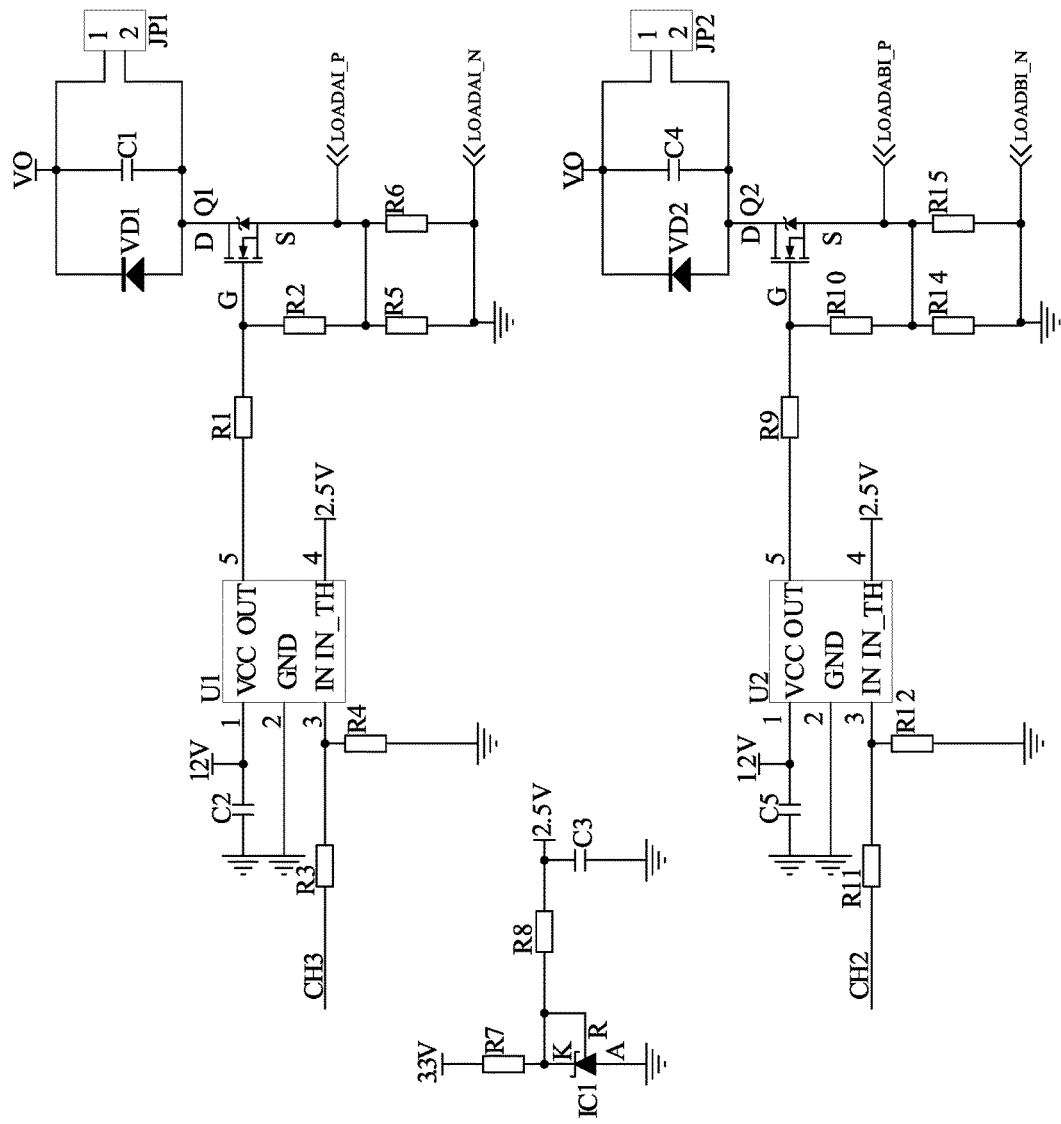
FIG. 5 is a schematic principle diagram of an output circuit of the present disclosure.

As shown in FIG. 5, the output circuit 4 includes interfaces JP1, JP2, capacitors C1, C2, C3, C4, C5, resistors R1, R2, R3, R4, R5, R6, R7, R8, R9, R10, R11, R12, R14, R15, diodes VD1, VD2, a MOS transistor Q2, chips U1, U2, and a programmable three-terminal voltage regulator IC1.

Figure 6:
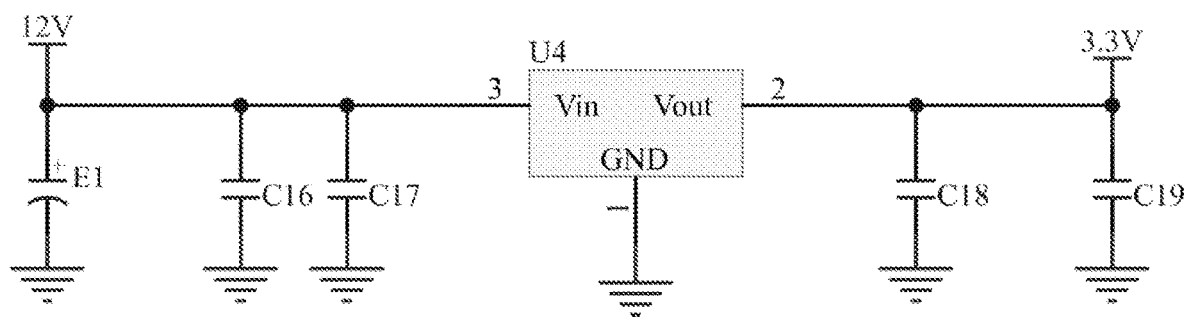
FIG. 6 is a schematic principle diagram of an LDO power circuit of the present disclosure.
Figure 7:
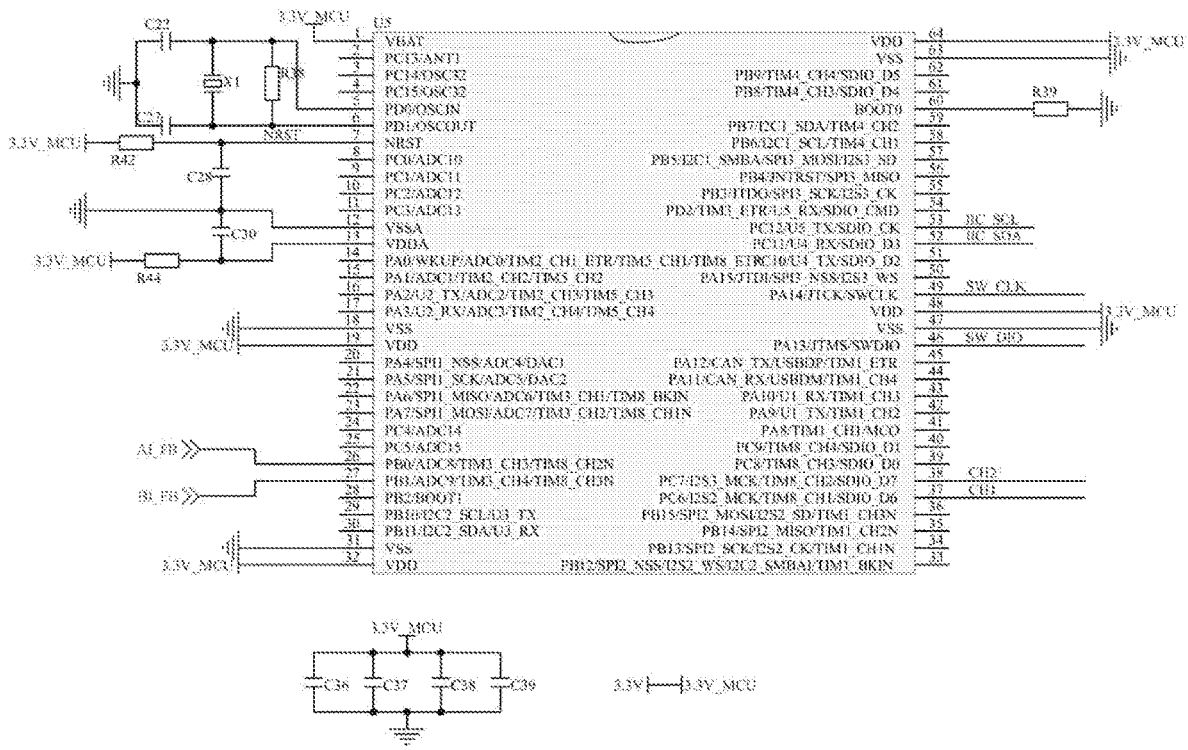
FIG. 7 is a schematic principle diagram of an MCU minimum system of the present disclosure.
Figure 8:
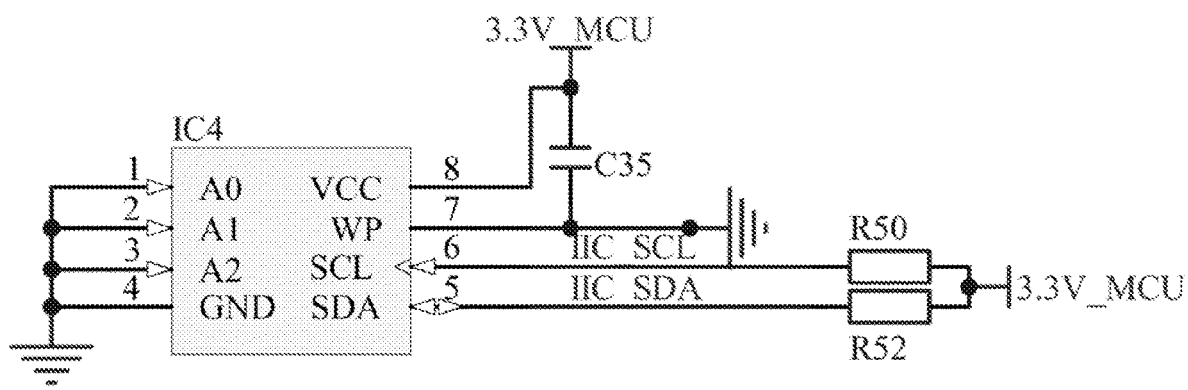
FIG. 8 is a schematic principle diagram of a data storage circuit of the present disclosure.
Figure 9:
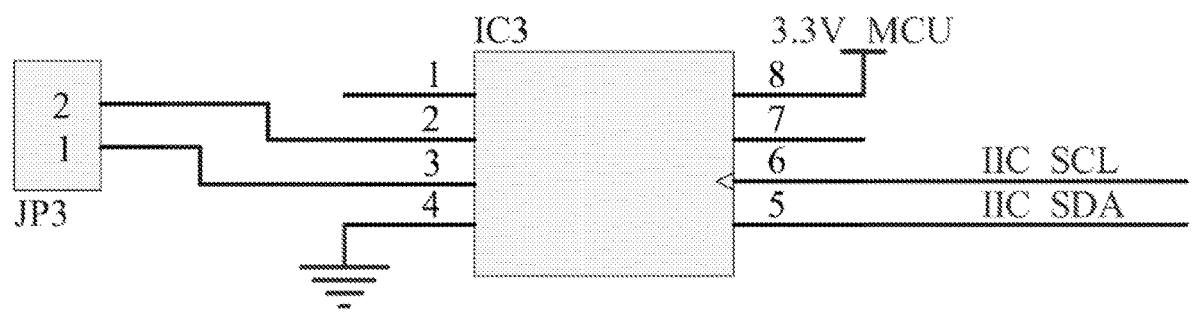
FIG. 9 is a schematic principle diagram of a parameter setting circuit of the present disclosure.
Figure 10:
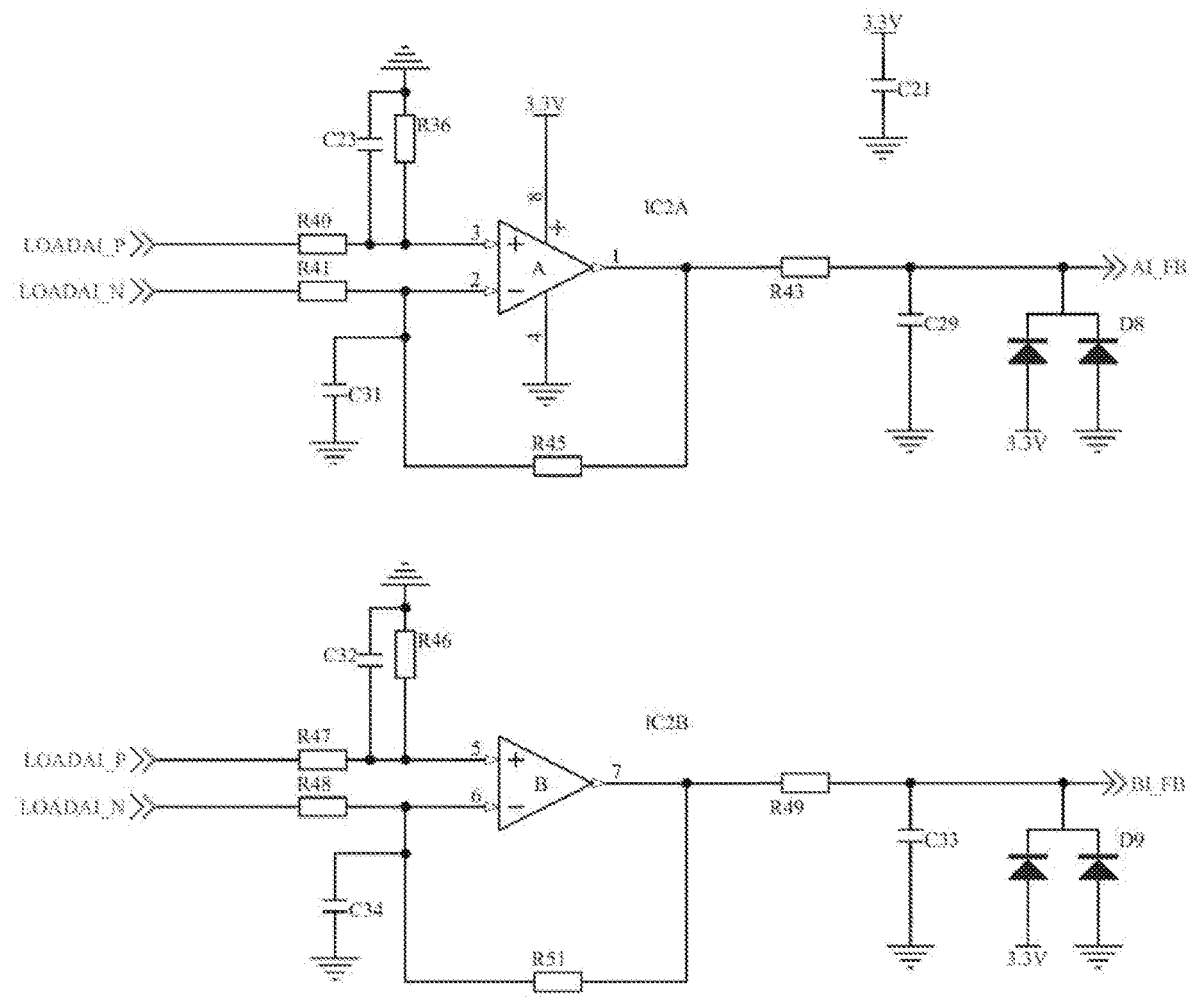
FIG. 10 is a schematic principle diagram of a Class2 acquisition circuit of the present disclosure.

As shown in FIG. 6, the LDO power circuit 5 includes capacitors E1, C16, C17, C18, C19, and a chip U4. As shown in FIG. 7, the MCU minimum system 6 includes a chip U5, capacitors C22, C28, C30, C36, C37, C38, C39, resistors R38, R39, R42, R44, and a crystal oscillator X1. As shown in FIG. 8, the data storage circuit 7 includes a chip IC4, a capacitor C35, and resistors R50, R52. As shown in FIG. 9, the parameter setting circuit 8 includes a chip IC3 and an interface JP3. As shown in FIG. 10, the Class2 acquisition circuit 9 includes resistors R36, R40, R41, R43, R45, R47, R48, R49, R51, capacitors C23, C29, C31, C32, C33, C34, diodes D8, D9, and comparators IC2A, IC2B.

Connection manners of all the above circuits are shown in the corresponding attached circuit, which are clear at a glance and will not be repeated here.

The multifunctional dimming power supply circuit of the present disclosure can realize the following functions:

By using the parameter setting circuit, various color temperature values or color temperatures of various light sources or lamps can be switched. For example, switching from a color temperature of 2800 K to a color temperature of 6500 K is achieved, which solves the problem that end users do not need to rely on an external controller to control a color temperature value of a light source or a lamp, so that individual needs of the end users for a lighting atmosphere are quickly and efficiently met, and the problem that wholesalers and retailers prepare a variety of color temperature inventories is also solved.

By using the parameter setting circuit, various different output frequencies can be switched, for example, from 230 HZ to 20000 HZ, so that the end users can select the most suitable frequency according to matching of different types of light sources or lamps in actual use, to prolong the lives of the light sources or lamps, make the light sources or lamps more durable, and meet the individual needs of the end users to the largest extent. For example, some light sources or lamps with built-in DC to DC circuits include capacitive load circuits, while parameters of DC to DC chips produced by various manufacturers vary greatly. Some DC to DC chips can achieve a dimming effect only under a high frequency, and some DC to DC chips can ensure the lives of the light sources and lamps only under a low frequency. Therefore, products capable of switching different frequencies are more popular with the end users.

By using the parameter setting circuit, a variety of different dimming curves can be switched, for example, from a gamma value (0.1 to 9.9) or from a default parabolic dimming curve to a quarter semicircular curve, or from a straight line to an oblique straight line. As a result, end users see a variety of dimmer controllers of different brands and with different model numbers in practical applications. For the dimmer controllers of different brands or with different model numbers, the most direct way for the end surfaces to gain an ideal dimming effect is to match the most appropriate dimming curve according to a selected dimming controller, so as to make the lighting atmosphere best. Dimming is soft and smooth, without progression, and a light source or lamp does not flash.

By using the Class2 acquisition circuit and the MCU minimum system, a post-stage direct-current circuit is accurately controlled, and the output current and voltage are accurately calculated, so that the maximum output current does not exceed 5 A, and the power does not exceed 100 W. When an output is short-circuited, the single-chip microcomputer commands to switch on an absorption circuit to absorb a huge surge voltage generated by the short circuit, and the output is switched off at the same time, to avoid the possibility that continuous short circuiting at an output end may damage internal devices. The vast majority of product circuits on the market use analog circuits to achieve the standard Class2, so this circuit uses a digital circuit implemented by a complete digital program to achieve the standard Class2, which solves the problem that an analog circuit is complex and easily causes damages to various components. This circuit is characterized by high efficiency, accuracy and reliability.

Specific examples are used herein to illustrate the principle and implementations of the present disclosure. The descriptions of the above embodiments are only used to help understand the method and its key thoughts of the present disclosure. Moreover, for those of ordinary skill in the art, according to the ideas of the present disclosure, there will be changes in the specific implementations and the scope of application. In summary, the content of this specification should not be construed as limiting the present disclosure.

What is claimed is:

1. A multifunctional dimming power supply circuit for a light-emitting diode (LED) light source, comprising an alternating-current input circuit, an alternating-current/direct-current (AC/DC) circuit, a feedback control loop, an output circuit, low dropout regulator (LDO) power circuit, a micro control unit (MCU) minimum system, a data storage circuit, a parameter setting circuit and a Class2 acquisition circuit, wherein the alternating-current input circuit is connected to an AC/DC circuit to provide an alternating current; the AC/DC circuit is connected to the output circuit, the feedback control loop and the LDO power circuit to convert the alternating current into a direct current;

the feedback control loop is used for controlling the AC/DC circuit according to the direct current output by the AC/DC circuit to make the AC/DC circuit output a stable direct current;

the LDO power circuit is used for converting the direct current output by the AC/DC circuit into low-voltage power supplied to the MCU minimum system, the data storage circuit, the parameter setting circuit and Class2 acquisition circuit;

the parameter setting circuit comprises at least one of a wireless communication module and a multi-gear switch; the wireless communication module and the multi-gear switch are used for obtaining set parameters according to an operation of a user; the set parameters comprise an output power parameter, a color temperature parameter and a dimming curve parameter; the multi-gear switch comprises a power gear switch for switching different output powers, a color temperature gear switch for switching different color temperatures and a dimming curve gear switch for switching different dimming curves; each gear of the power gear switch corresponds to one output power parameter; each gear of the color temperature gear switch corresponds to one color temperature parameter; each gear of the dimming curve gear switch corresponds to one dimming curve parameter;

the MCU minimum system is used for obtaining the set parameters and storing the set parameters to the data storage circuit, and the MCU minimum system is also used for generating a first control signal according to the set parameters;

the Class2 acquisition circuit is used for acquiring the set parameters through the MCU minimum system to generate a second control signal according to the set parameters; and the output circuit is used for driving the LED light source to emit light by using the set parameters under the control of the first control signal and the second control signal, and make the output power and output current meet requirements of an American Standard Class2.

2. The multifunctional dimming power circuit according to claim 1, wherein the alternating-current input circuit comprises a live line input terminal, a null line input terminal, a variable resistor RV1, capacitors CX1, CX2, CY1, CY2, transformers L2, L3, resistors R16, R17, R20, R21, a null line output terminal AC_N and a live line output terminal AC_L.

3. The multifunctional dimming power supply circuit according to claim 2, wherein the AC/DC circuit comprises a rectifier DB1, capacitors C6, C7, C8, C9, C10, C11, C13, C14, C15, C20, C25, C24, C26, EC1, EC2, EC3, an inductor L1, a transformer L4, resistors R13, R18, R19, R22, R23, R24, R25, R26, R27, R28, R29, R30, R31, R33, R35, R37, diodes D1, D2, D3, D4, D6, D7, a voltage-regulator tube Z1, a metal oxide semiconductor (MOS) transistor Q3, a triode Q4 and a chip U3; and the transformer L4 comprises a primary winding T1A, a first secondary winding T1B, a second secondary winding T1D and an auxiliary winding T1C.

4. The multifunctional dimming power supply circuit according to claim 3, wherein the feedback control loop comprises a diode D5, a capacitor C12, a resistor R32 and a resistor R34.

5. The multifunctional dimming power supply circuit according to claim 4, wherein the output circuit comprises interfaces JP1, JP2, capacitors C1, C2, C3, C4, C5, resistors R1, R2, R3, R4, R5, R6, R7, R8, R9, R10, R11, R12, R14, R15, diodes VD1, VD2, a MOS transistor Q2, chips U1, U2, and a programmable three-terminal voltage regulator IC1.

6. The multifunctional dimming power circuit according to claim 4, wherein the LDO power circuit comprises capacitors E1, C16, C17, C18, C19, and a chip U4.

7. The multifunctional dimming power supply circuit according to claim 6, wherein the MCU minimum system comprises a chip U5, capacitors C22, C28, C30, resistors R38, R39, R42, R44, and a crystal oscillator.

8. The multifunctional dimming power supply circuit according to claim 7, wherein the data storage circuit comprises a chip IC4, a capacitor C35, and resistors R50, R52.

9. The multifunctional dimming power supply circuit according to claim 7, wherein the parameter setting circuit comprises a chip IC3 and an interface JP3.

10. The multifunctional dimming power supply circuit according to claim 7, wherein the Class2 acquisition circuit comprises resistors R36, R40, R41, R43, R45, R47, R48, R49, R51, capacitors C23, C29, C31, C32, C33, C34, diodes D8, D9, and comparators IC2A, IC2B.

* * * * *